(12) United States Patent
Hull et al.

(10) Patent No.: US 6,727,612 B1
(45) Date of Patent: Apr. 27, 2004

(54) PLASTIC FASTENER

(75) Inventors: Michael L. Hull, Anderson, IN (US);
Debabrata Sarkar, Anderson, IN (US);
Steve J. Shields, Muncie, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/266,559

(22) Filed: Oct. 8, 2002

(51) Int. Cl.⁷ ................................................ H02K 5/00
(52) U.S. Cl. ........................ 310/68 D; 310/91; 411/501
(58) Field of Search ................................ 310/68 D, 91, 310/71; 411/501

(56) References Cited

U.S. PATENT DOCUMENTS

| | | | |
|---|---|---|---|
| 4,606,000 A | * 8/1986 | Steele et al. | 363/145 |
| 5,043,836 A | 8/1991 | Fukushima | 361/301 |
| 5,361,483 A | * 11/1994 | Rainville et al. | 29/524.1 |
| 5,646,838 A | 7/1997 | Keidar et al. | 363/145 |
| 5,712,517 A | 1/1998 | Schmidt et al. | 310/45 |
| 5,812,388 A | * 9/1998 | Keidar et al. | 310/68 D |
| 5,866,963 A | 2/1999 | Weiner et al. | 310/68 D |
| 5,977,669 A | * 11/1999 | Yoshida et al. | 310/68 D |
| 6,304,012 B1 | 10/2001 | Chen et al. | 310/58 |

* cited by examiner

Primary Examiner—Burton Mullins
(74) Attorney, Agent, or Firm—Jimmy L. Funke

(57) ABSTRACT

A plastic fastener is disclosed. The fastener may be employed in a vehicle generator. The fastener has a plastic body extending through an aperture of a first component and through an aperture of a second component. The body has a first distal head that retainingly abuts the opening of the aperture of the first component. The plastic body also has a second distal head that retainingly abuts the opening of the aperture of the second component. The configuration of the body secures the first component to the second component. The invention further provides a method of fastening components of a vehicular generator. A plastic body with first and second studs is over molded about a first generator component. At least one stud may be extended through an aperture of a second generator component. The studs are then formed into distal heads to secure the first component to the second component.

4 Claims, 3 Drawing Sheets

PLASTIC FASTENER

TECHNICAL FIELD

The present invention relates to a plastic fastener and a method of fastening components components.

BACKGROUND OF THE INVENTION

A conventional vehicular generator, sometimes referred to as an alternator, includes a variety of electrical components, such as a positive heat sink, a rectifier bridge, a brush box, and a voltage regulator. These components are commonly secured to each other and/or to the generator frame. Mounting the components in this fashion enhances heat transfer within the generator, secures the electrical components so as to reduce damaging vibrations, and may provide electrical grounds and positive electrical connections between various components.

The electrical components are commonly mounted with threaded fasteners, such as screws. However in order to maintain electrical isolation between the fastener, components, and frame, plastic or other insulators are typically required. Such an approach is shown in U.S. Pat. No. 6,304,012 to Chen et al., which depicts a mounting bolt (255) having an insulator (256) for insulating the slip ring end housing (74) from the rectifier (252). A similar approach is also shown in U.S. Pat. No. 5,712,517 to Schmidt et al., which illustrates rivets (75) with rivet insulators (76) that are used to secure an interconnection plate (70) to an upper surface (9) of a control plate/heat sink (10).

Nevertheless, the typical method of securing generator components with insulated threaded fasteners presents several challenges. To avoid loosening of the fastener, the fastener must be maintained at a high tension. This tension results in a continuously high compressive load on the plastic insulator at high temperatures. Under such a load, the plastic insulator may creep, and loosen the fastener. Loose fasteners may lead to a lower compressive load on the components in the stack-up, which may deteriorate the necessary electrical contact between the components.

There is consequently a need in the art for a vehicular generator fastener, and/or a method of fastening components of a vehicular generator, that overcomes one or more of the above limitations.

SUMMARY OF THE INVENTION

One object of the present invention is to provide a solution to one or more problems set forth above. One advantage of the present invention is that a plastic fastener, as disclosed herein, replaces more expensive steel screws and related accessories, such as compression limiters, and/or spring elements like crest-cup washers. Since the present invention serves as both a fastener and an insulator, it more efficiently utilizes available package space where the accommodation of both metal fasteners and necessary insulation may be required. In addition, as the plastic fastener is an electrical insulator, the inventive fastener reduces local grounding of the components, such as salt bridging. Moreover, because the plastic fastener is more flexible than a metal screw, greater tolerances may be designed in the stack up of mating components; that is, the mounting aperture of a first component need not align exactly with the mounting aperture of a second component.

It is a primary object of the present invention to overcome the foregoing problems and/or to satisfy at least one of the aforementioned needs. The invention provides a plastic fastener for a vehicular generator having a body that extends through an aperture of a first component of the generator and that extends through an aperture of a second component of the generator. The plastic body has a first distal head that retainingly abuts an outer opening of the aperture of the first component. The plastic body also has a second distal head that retainingly abuts an outer opening of the aperture of the second component. The configuration of the plastic body secures the first component to the second component.

The invention further provides a method of fastening components of a vehicular generator. A first component of the generator is provided. The first component has an aperture. A plastic body is extended through the aperture of the first component. The plastic body has a first stud end and a second stud end. The second stud end is extended through an aperture of a second component of the generator. The first stud is then formed into a first distal head that retainingly abuts an outer opening of the aperture of the first component. The second stud is formed into a second distal head that retainingly abuts an outer opening of the aperture of the second component. This method secures the first component to the second component.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
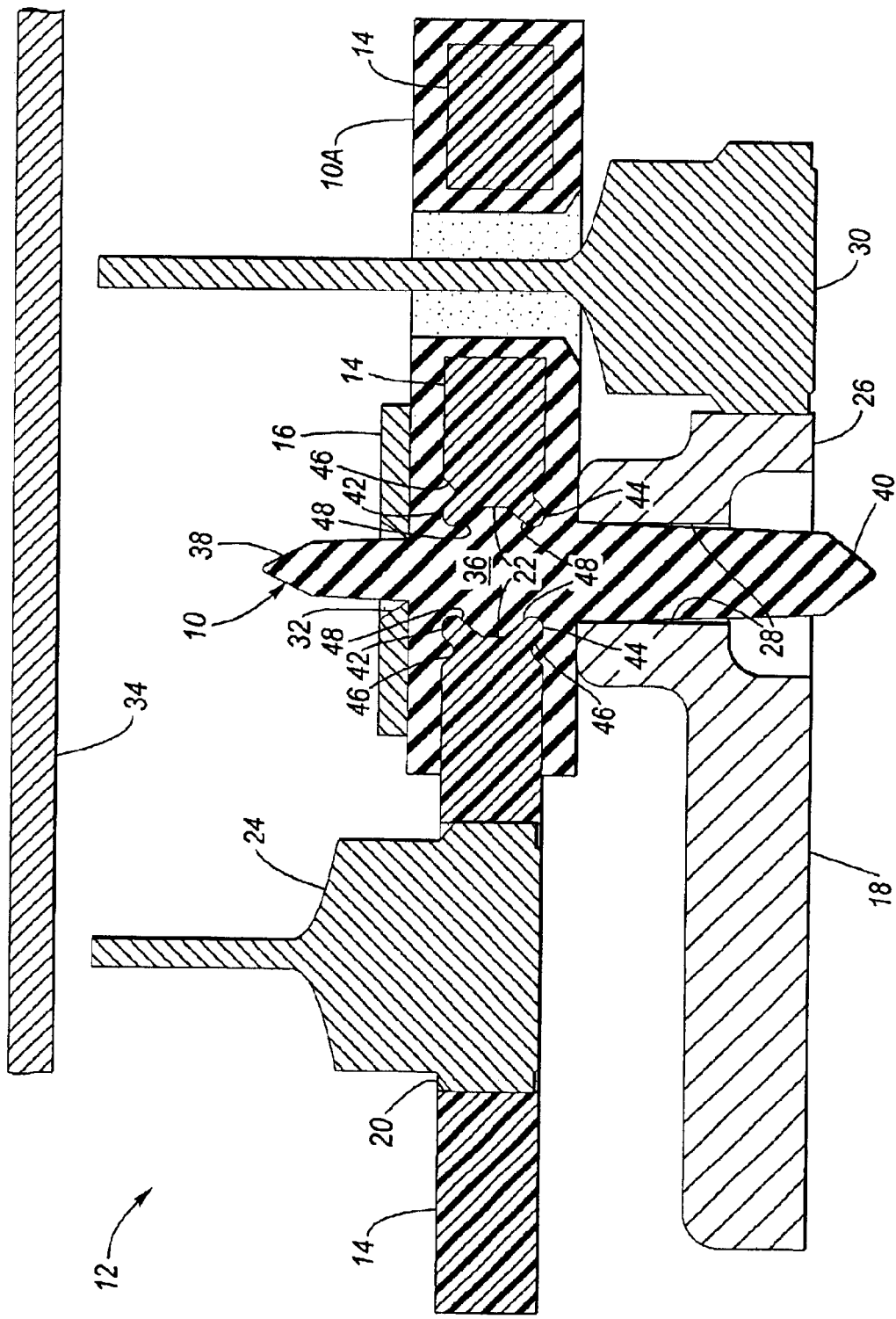
FIG. 1 is a cross sectional view of a partially manufactured plastic fastener according to the present invention in one environment of a vehicular generator.

Referring now to the Figures wherein like reference numerals are used to identify identical components in the various views, FIG. 1 depicts a partially manufactured plastic fastener 10 in one embodiment of a vehicular generator. Fastener 10 may be constructed in a manner more fully described below. Fastener 10 may be used to secure one or more components of a vehicular generator to another component. In the embodiment shown in FIG. 1, fastener 10 is utilized in a rectifier assembly 12, and specifically is positioned to secure a positive heat sink 14 and terminal assembly 16 to a slip ring end (SRE) frame 18.

In order to more fully appreciate the inventive fastener 10, the surrounding environment of FIG. 1 will first be described in more detail. Rectifier assembly 12 is provided to rectify the output voltage of an alternating current generator. It may be used as part of an air-cooled or water-cooled generator. Positive heat sink 14 may be generally arc shaped and may be made out of a thermally and electrically conductive material, such as aluminum. Positive heat sink 14 may include one or more diode mounts 20, and one or more apertures 22 for supporting fastener 10 in the manner described below.

Each diode mount 20 is adapted to retain a respective diode 24 in a thermally and electrically conductive manner. Heat from diode 24 is transferred to heat sink 14 to provide the desired heat sink effect. Diode 24 may be of the press-fit variety. In the depicted environment, press-fit diode 24 is commonly referred to as a positive-side diode, and heat sink 14 is commonly referred to as a positive heat sink since a positive direct voltage is developed on heat sink 14.

SRE frame 18 provides an outer portion of a housing structure for the generator. It cooperates with a drive end frame (not shown) to define an interior space (not shown) to house a rotor assembly (not shown). SRE frame may be made out of cast aluminum, or other suitable thermally and electrically conductive material. SRE frame 18 may include one or more diode mounts 26, and one or more through bores, or apertures, 28 for supporting fastener 10 in the manner described below.

In the environment shown in FIG. 1, SRE frame 18 additionally serves as a negative heat sink. Each diode mount 26 is adapted to retain a respective diode 30 in a thermally and electrically conductive manner. Heat from diode 30 is transferred to SRE frame 18 to provide the desired heat sink effect. Like diode 24, diode 30 may be of the press-fit variety. In the depicted environment, press-fit diode 30 is commonly referred to as a negative-side diode, and SRE frame 18 may serve as a negative heat sink since a negative direct voltage is developed on SRE frame 18.

Terminal assembly 16 may be provided for electrically connecting phase leads (not shown) from a stator to diodes 24, 30, in a manner not depicted herein. Terminal assembly 16 may be made from an electrically conductive material, such as copper, and may further include an overcoating of plastic, or other electrically insulating material, which may provide additional rigidity. Terminal assembly 16 may include an aperture 32 for receiving fastener 10.

Rectifier assembly 12 may also include rear cover 34. Cover 34 may be a plastic cover with air flow passages (not shown). Cover 34 may be provided to protect the generator from inadvertent grounding, and may assist in preventing contamination of the generator.

With the recitation of the foregoing environment, a preferred embodiment of the inventive fastener, and method of fastening, will now be detailed. Fastener 10 may be made from a variety of plastics that are durable enough to withstand loads of 0–50 Newtons and temperatures of —40 to 150 degrees Celsius. Notwithstanding the foregoing force and temperature ranges for the above described environment, those skilled in the art will recognize that the inventive fastener may accommodate other ranges in other environments in which the fastener may be employed.

Fastener 10 may generally include a body 36, a stud 38, and a stud 40. Body 36 extends through aperture 22 of heat sink 14 and through aperture 28 of SRE frame 18. Body 36 may additionally extend through aperture 32 of terminal assembly 16. Stud 38 extends beyond aperture 22 and, if fastener 10 is utilized to secure terminal assembly 16, then stud 38 extends beyond aperture 32. Stud 40 extends beyond aperture 28.

Fastener 10 may be formed by over molding body 36, stud 38, and stud 40 about heat sink 14. In particular, aperture 22 may be pierced, or sledged, in heat sink 14, such that upper lip 42 and lower lip 44 of aperture 22 are formed. Body 36, with stud 38 and stud 40, may then be over molded within aperture 22. Upper lip 42 and lower lip 44 provide additional surface area to anchor fastener 10 to heat sink 14. Specifically, upper lip 42 and lower lip 44 define outer lip surfaces 46 and inner lip surfaces 48 to anchor fastener 10 at either high or low temperature extremes of the surrounding environment. During low temperature extremes, fastener 10 contracts down on surface 46 tightly. Similarly, in high temperature extremes fastener 10 expands toward surface 48 tightly. Accordingly, at either temperature extreme fastener 10 may hold the components of the generator securely.

As shown in FIG. 1, body 36 may extend beyond aperture 22 and be over molded and disposed about heat sink 14. Upon being formed about heat sink 14, stud 40 may be positioned through aperture 28, and stud 38 may be optionally extended through aperture 32. It will be appreciated by those skilled in the art that fastener 10 may be formed about heat sink 14 through other conventional methods. Moreover additional fasteners, such as the partially shown fastener 10A in FIG. 1, may be employed within an enviromnent of a vehicular generator.

Figure 2:
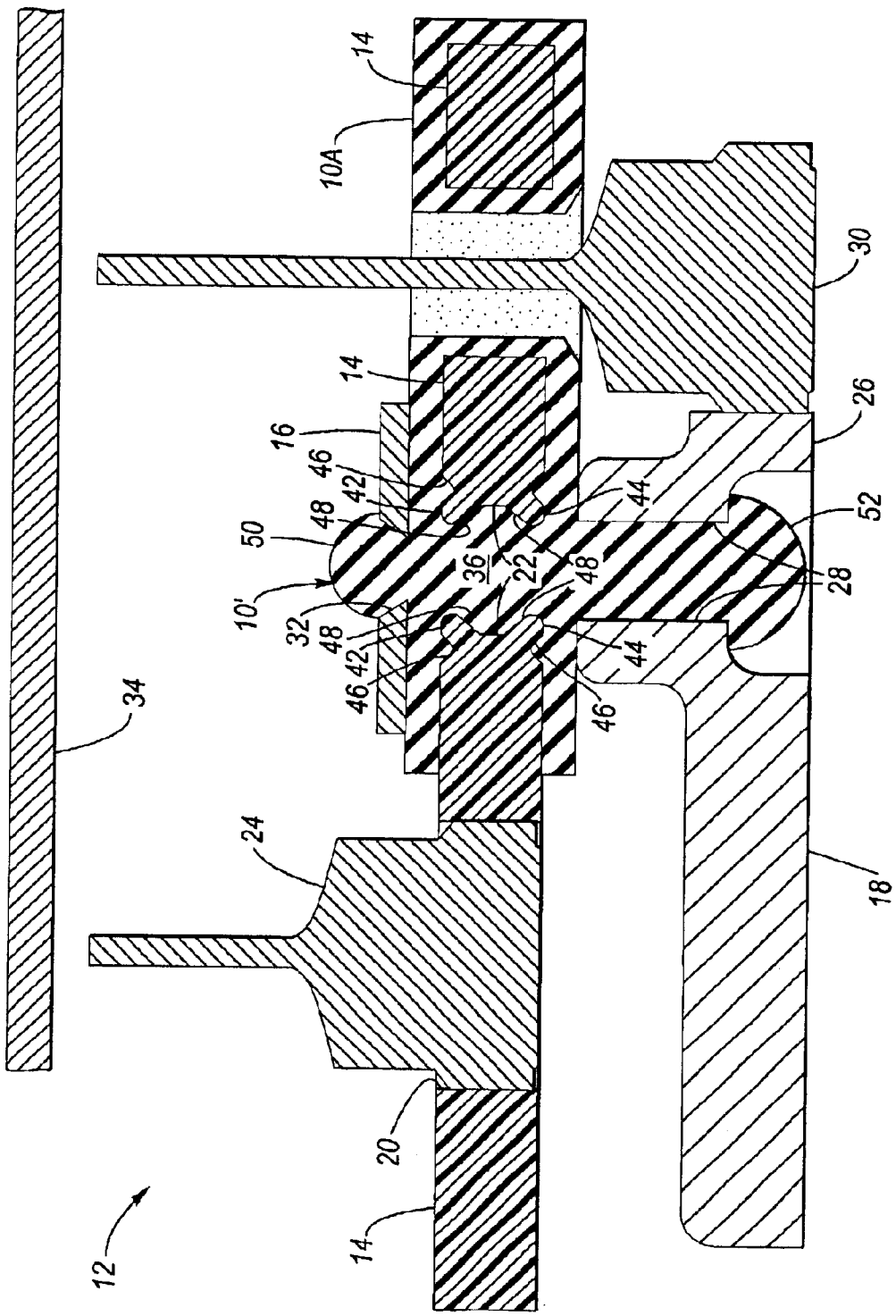
FIG. 2 is a cross sectional view of a fully manufactured plastic fastener according to the present invention in the environment shown in FIG. 1.

FIG. 2 depicts fastener 10 in a completely manufactured form 10'. In fastener 10', stud 38 and stud 40 have been formed into distal head 50 and distal head 52, respectively. Distal head 50 abuts aperture 32 to retain heat sink 14. As shown in FIG. 2, terminal assembly 16 may be interposed between beat sink 14 and distal head 50, such that distal head 50 abuts aperture 32 to secure terminal assembly 16 relative to heat sink 14. Similarly, distal head 52 abuts aperture 28 to secure heat sink 14 to SRE frame 18.

Distal head 50 and distal head 52 may be formed by ultrasonic welding stud 38 and stud 40. Those skilled in the art will appreciate that other manufacturing methods, such as heat staking, may be similarly effective in forming distal heads 50 and 52. Distal head 50 is formed such that it has a diameter larger than the diameter of the opening of aperture 32 to which it abuts. Similarly, distal head 52 is formed such that it has a diameter larger than the diameter of the opening of aperture 28 to which it abuts.

Figure 3:
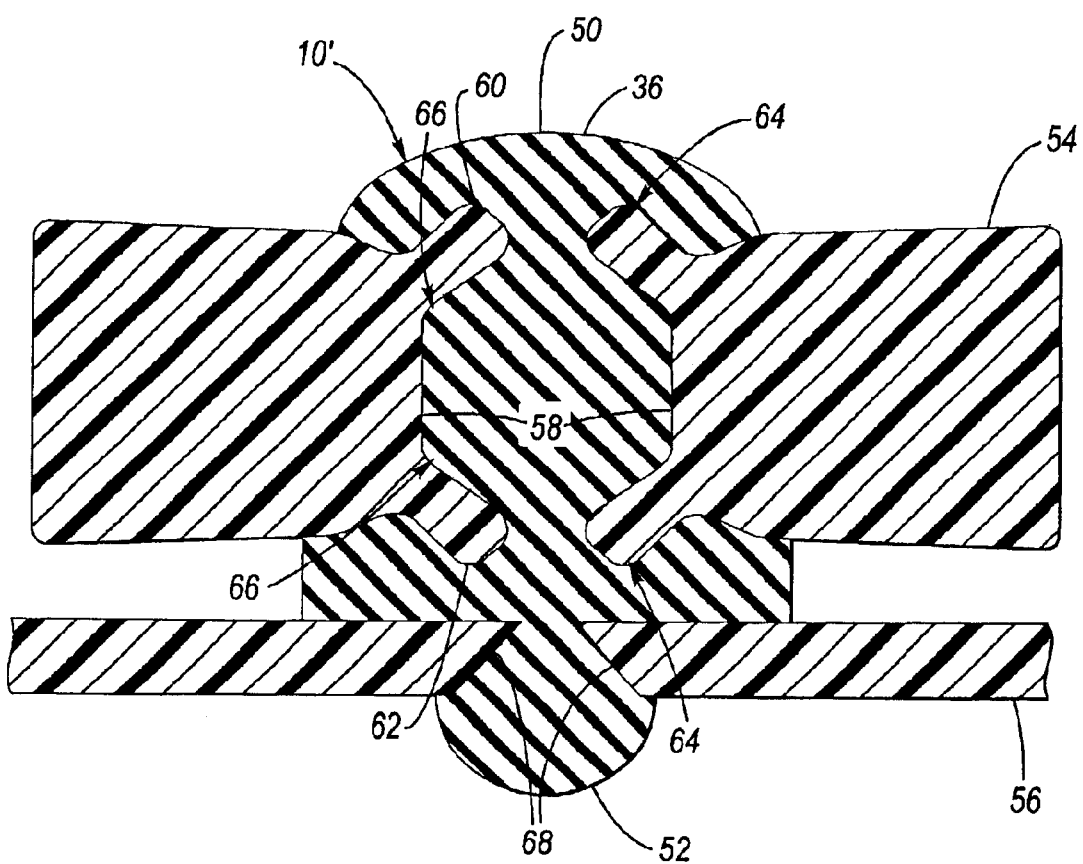
FIG. 3 is a cross sectional view of a fully manufactured plastic fastener according to the present invention in another environment.

While FIGS. 1 and 2 depict fastener 10 and 10' in one environment of a vehicular generator, it will be appreciated by those skilled in the art that the inventive fastener 10' may be employed in other environments where similar benefits can be realized. FIG. 3 represents the utilization of fastener 10' to secure components in other such environments. Fastener 10' is shown in FIG. 3 with its body 36, distal head 50, and distal head 52. In this environment, for example, fastener 10' may secure one component 54 to a second component 56. Such components may include, for example, a brush box assembly and voltage regulator, respectively.

Like heat sink 14, component 54 includes an aperture 58 that may be pierced, or sledged, to form an upper lip 60 and a lower lip 62. Lips 60 and 62 define outer lip surface 64 and inner lip surface 66 for securing body 36 when it contracts and expands, respectively, at varying operating temperatures of the environment. Like SRE frame 18, component 56 includes an aperture 68. Distal head 50 and distal head 52 retainingly abut the outer openings of aperture 58 and aperture 68, respectively, to secure component 54 to component 56. While apertures 58 and 68 are coaxial in the illustrated embodiment, it will be appreciated by those skilled in the art that due to the flexibility of fastener 10', both inherently and since it may be over molded to in a variety of shapes, apertures 58 and 68 may be offset from each other.

The present invention may be employed in any application where the retention stress on the joint to be fastened is within the capabilities of the plastic material chosen. Further, the inventive fastener may be beneficially employed in environments which are exposed to temperature fluctuations.

While the present invention has been described with reference to certain preferred embodiments and implementations, it is understood that various modifications and variations will no doubt occur to those skilled in the art to which this invention pertains. These and all basically rely of the teachings through which this disclosure has advanced the art are properly considered within the scope of this invention.

What is claimed is:

1. A plastic fastener for a vehicular generator, comprising: a body disposed on a first component of said vehicular generator, said body extending through an aperture of said first component, said bode extending through an aperture of a second component of said vehicular generator, said body having a first distal head with a diameter larger than the diameter of said aperture of said first component, and said body having a second distal head having a second distal head with a diameter larger than the diameter of said aperture of said second component, whereby said first component is secured to said second component, wherein said body may contract to contact an outer surface of a lip of said aperture of said first component, said outer surface exterior of said aperture of said first component, and wherein said body may expand to contact an inner surface of said lip, said inner surface of said aperture of said first component.

2. The plastic fastener of claim 1, wherein said body further extends through an aperture of a third component of said vehicular generator, said third component interposed between said first component and said first distal head, and wherein said first component comprises a heat sink, said second component comprises a slip ring end frame, and said third component comprises a terminal assembly.

3. A plastic fastener for a vehicular generator, comprising: a body extending through an aperture of a first component of said vehicular generator and said body extending through an aperture of a second component of said vehicular generator, said body having a first distal head abutting said aperture of said first component, and said body having a second distal head abutting said aperture of said second component, wherein said body may contract to contact an outer surface of a lip of said aperture of said first component, said outer surface exterior of said aperture of said first component, and wherein said body may expand to contact an inner surface of said lip, said inner surface interior of said aperture of said first component, whereby said first component is secured to said second component.

4. A plastic fastener for a vehicular generator, comprising: a body extending through an aperture of a heat sink of said vehicular generator, said body extending through an aperture of a slip ring end frame of said vehicular generator, said body having a first distal head abutting said aperture of said heat sink, and said body having a second distal head abutting said aperture of said slip ring end frame, and wherein said body further extends through an aperture of a terminal assembly interposed between said heat sink and said first distal head.

* * * * *